(12) United States Patent
Si

(10) Patent No.: US 9,502,998 B1
(45) Date of Patent: Nov. 22, 2016

(54) SYSTEMS AND METHODS FOR CONTROLLING MOTOR TORQUE OUTPUT

(71) Applicant: CATERPILLAR INC., Peoria, IL (US)

(72) Inventor: Baojun Si, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/714,507

(22) Filed: May 18, 2015

(51) Int. Cl.
*H02P 21/00* (2016.01)
*H02P 6/08* (2016.01)
*H02P 27/06* (2006.01)

(52) U.S. Cl.
CPC ............. *H02P 6/08* (2013.01); *H02P 27/06* (2013.01)

(58) Field of Classification Search
CPC ........ H02P 21/06; H02P 27/08; H02P 27/04; H02P 6/205; D06F 37/304
USPC ............ 318/700, 400.01, 400.02, 400.14, 318/400.15, 400.2, 400.26, 400.37, 400.38, 318/400.39, 400.4, 799, 801, 432, 599, 318/811; 388/800, 819, 823; 363/40, 95, 363/131, 132
See application file for complete search history.

(56) References Cited

U.S. PATENT DOCUMENTS

| 3,506,900 | A | 4/1970 | Neuffer et al. | |
|---|---|---|---|---|
| 4,388,577 | A | 6/1983 | Blaschke et al. | |
| 6,653,812 | B1* | 11/2003 | Huo | H02M 7/53875 318/801 |
| 7,423,412 | B2 | 9/2008 | Weng et al. | |
| 7,548,443 | B2* | 6/2009 | Arisawa | H02M 7/53875 363/132 |
| 2004/0145356 | A1 | 7/2004 | Kalman et al. | |
| 2010/0060211 | A1* | 3/2010 | Hashimoto | H02P 27/08 318/400.02 |
| 2014/0210387 | A1* | 7/2014 | Zhao | H02P 21/06 318/400.02 |
| 2014/0333241 | A1* | 11/2014 | Zhao | H02P 21/06 318/400.02 |
| 2015/0128660 | A1* | 5/2015 | Jung | D06F 37/304 68/3 R |

OTHER PUBLICATIONS

Joachim Holtz et al., "On Continuous Control of PWM Inverters in the Overmodulation Range Including the Six-Step Mode," published on IEEE Transactions on Power Electronics, vol. 8, No. 4, Oct. 1993.

* cited by examiner

*Primary Examiner* — Antony M Paul
(74) *Attorney, Agent, or Firm* — Finnegan, Henderson, Farabow, Garrett & Dunner, LLP; L. Glenn Waterfield

(57) ABSTRACT

Systems and methods are disclosed for controlling a torque output by an AC motor drawing power from a DC bus. According to certain embodiments, the system for controlling the torque output has a controller and an inverter. The controller further has an operation status detector, a basic voltage vector calculator, and a voltage command generator. The operation status detector is configured to determine a DC bus voltage and a rotor field vector. The basic voltage vector calculator is configured to calculate a plurality of basic voltage vectors having a magnitude proportional to the DC bus voltage. The voltage command generator is configured to generate a voltage command for producing a stator field vector. Producing the stator field vector includes at least one of maintaining a constant angle between the stator field vector and the rotor field vector, and setting a magnitude of the stator field vector equal to the magnitude of the plurality of basic voltage vectors. The inverter is electrically connected to the controller and configured to receive the voltage command. The inverter is also configured to convert the DC bus voltage to one or more AC voltage signals according to the voltage command. The inverter is further configured to apply the one or more AC voltage signals to the AC motor to produce the stator field vector.

17 Claims, 4 Drawing Sheets

SYSTEMS AND METHODS FOR CONTROLLING MOTOR TORQUE OUTPUT

TECHNICAL FIELD

The present disclosure relates generally to systems and methods for controlling motor torque output, and more particularly, to systems and methods for controlling motor torque output at a specific direct current (DC) bus voltage.

BACKGROUND

Heavy duty machines such as mining trucks consume tremendous energy. Rising fuel costs and pressing environmental concerns call for improvement in fuel efficiency for these machines. For example, regenerative braking is an effective means to improve fuel efficiency for electrical drive mining trucks. During regenerative braking, a motor of the truck may function as a generator to slow the movement of the truck by converting the kinetic energy of the truck into electrical energy. The electrical energy is then supplied to a battery, a power supply, another motor, etc.

Part of the regenerated electrical energy may be absorbed by capacitors and resistors connected to a DC bus. This causes the DC bus voltage to rise. Thus, as a mobile vehicle repeatedly undergoes regenerative braking, the DC bus voltage may also fluctuate frequently in a wide range. Because a motor draws energy from the DC bus, such fluctuations of the DC bus voltage may significantly impact the amount of torque that can be generated by the motor. Unless the motor can efficiently use each DC bus voltage level to generate a desired torque, the overall fuel efficiency of the mobile vehicle will be undermined.

Vector control strategy can control torque in response to the DC bus voltage. U.S. Pat. No. 4,388,577 (the '577 patent) issued to Blaschke et al. on Jun. 14, 1983, discloses a system using a vector control strategy to control torque output in response to DC voltage fluctuation. The system of the '577 patent decomposes the stator field vector into a component perpendicular to the rotor field vector, and a component parallel to the rotor field vector. The system also uses space vector modulation to align the rotor field vector in phase with a stator field vector. At a given DC bus voltage, the system uses a feedback circuit to change the perpendicular component to a model perpendicular component. The model perpendicular component is a pre-calibrated value as a function of the DC bus voltage.

Although the system of the '577 patent may provide a solution to control motor torque output in response to a changing DC bus voltage, its reliance on the model perpendicular component may be unnecessarily complicated and may not be an efficient use of a specific DC bus voltage. In particular, the model perpendicular component needs constant calibration, which is time consuming. Moreover, the parallel component still exists and thus part of energy drawn from the DC bus is wasted in supplying this parallel component.

The disclosed system is directed to overcoming one or more of the problems set forth above and/or other problems of the prior art.

SUMMARY OF THE INVENTION

In one aspect, the present disclosure is directed to a system for controlling a torque output by an AC motor drawing power from a DC bus. The system includes a controller and an inverter. The controller further includes an operation status detector, a basic voltage vector calculator, and a voltage command generator. The operation status detector is configured to determine a DC bus voltage and a rotor field vector. The basic voltage vector calculator is configured to calculate a plurality of basic voltage vectors having a magnitude proportional to the DC bus voltage. The voltage command generator is configured to generate a voltage command for producing a stator field vector. Producing the stator field vector includes at least one of maintaining a constant angle between the stator field vector and the rotor field vector, and setting a magnitude of the stator field vector equal to the magnitude of the plurality of basic voltage vectors. The inverter is electrically connected to the controller and configured to receive the voltage command. The inverter is also configured to convert the DC bus voltage to one or more AC voltage signals according to the voltage command. The inverter is further configured to apply the one or more AC voltage signals to the AC motor to produce the stator field vector.

In another aspect, the present disclosure is directed to a method for controlling a torque output by an AC motor drawing power from a DC bus. The method includes determining a DC bus voltage and a rotor field vector. The method also includes calculating a plurality of basic voltage vectors having a magnitude proportional to the DC bus voltage. The method further includes generating a voltage command for producing a stator field vector. Producing the stator field vector includes at least one of maintaining a constant angle between the stator field vector and the rotor field vector, and setting a magnitude of the stator field vector equal to the magnitude of the plurality of basic voltage vectors.

In yet another aspect, the present disclosure is directed to a non-transitory computer-readable storage medium storing instructions for controlling a torque output by an AC motor drawing power from a DC bus. The instructions cause at least one processor to perform operations including determining a DC bus voltage and a rotor field vector. The operations also include calculating a plurality of basic voltage vectors having a magnitude proportional to the basic voltage vector. The operations further include generating a voltage command for producing a stator field vector. Producing the stator field vector includes at least one of maintaining a constant angle between the stator field vector and the rotor field vector, and setting a magnitude of the stator field vector equal to the magnitude of the plurality of basic voltage vectors.

DETAILED DESCRIPTION

Figure 1:
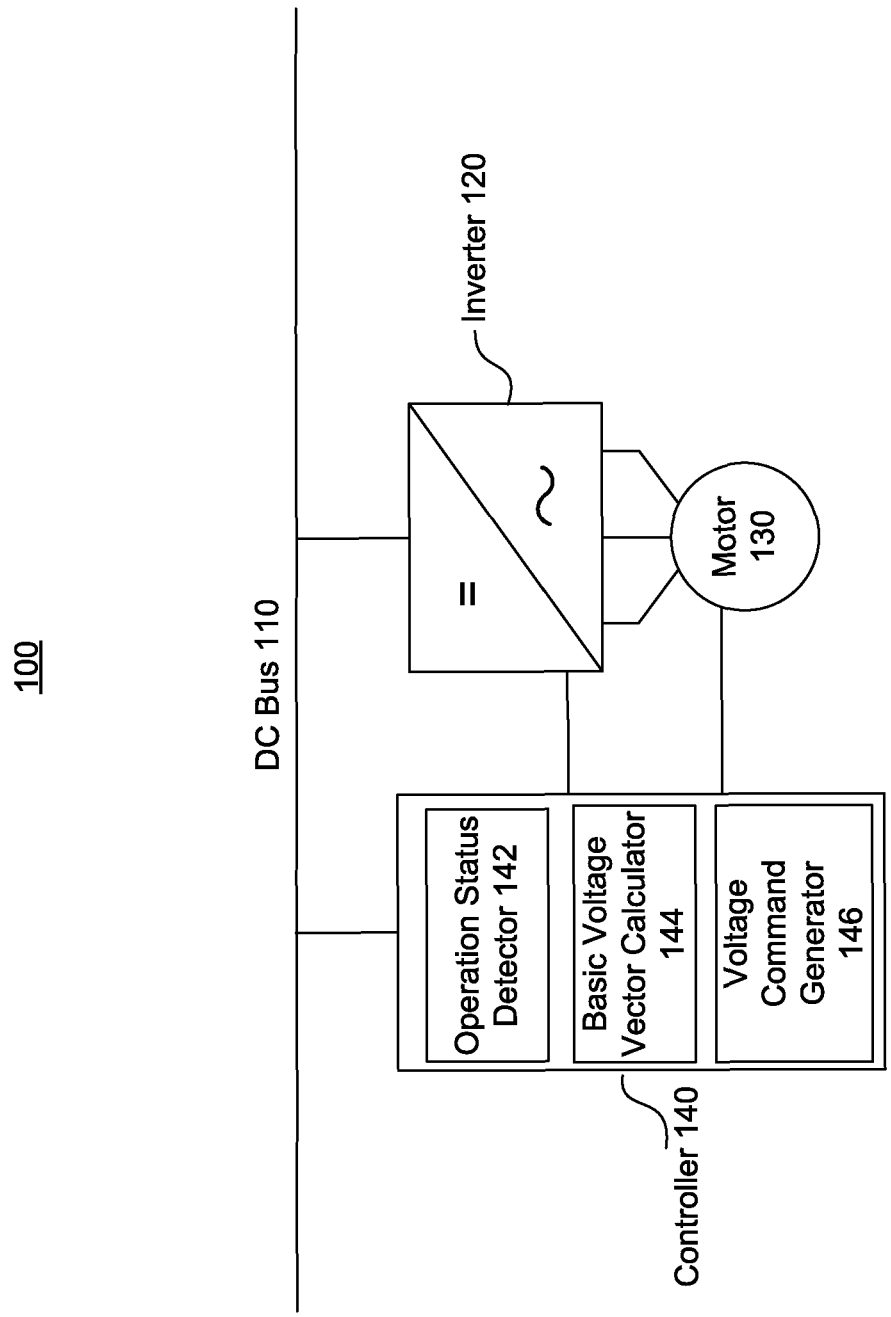
FIG. 1 is a schematic illustration of a system for controlling motor torque output, according to an exemplary embodiment.

FIG. 1 illustrates a system 100 for controlling motor torque output, according to an exemplary embodiment.

Referring to FIG. 1, system 100 may include a DC bus 110, an inverter 120, a motor 130, and a controller 140.

DC bus 110 may include positive and negative power lines that electrically connect inverter 120 with an electric power source, such as a generator. For example, the generator may be a motor working in the generator mode during regenerative braking. DC bus 110 may also be electrically connected to additional power storage devices and accessory power loads to provide power to and/or to remove power from DC bus 110.

Inverter 120 may be electrically connected to DC bus 110. Inverter 120 may be operable to receive the DC bus voltage and use it to generate one or more alternating current (AC) voltage signals. For example, inverter 110 may generate one or more AC voltage signals to energize the stator windings of motor 130. Inverter 120 may embody any inverter known in the art. That is, inverter 120 may embody any combination of power electronics, hardware, and/or software operable to convert DC power to AC power. For example, inverter 120 may include a three-phase inverter configured to generate three current signals to power motor 130. In certain embodiments, inverter 120 may be a pulse-width modulation (PWM) inverter. Further, inverter 120 may operate through the use of one or more switches or similar devices to convert DC power to AC power. For example, inverter 120 may include any number of thyristors, insulated gate bipolar transistors (IGBTs), metal-oxide-semiconductor field-effect transistors (MOSFETs), bipolar junction transistors (BJTs), resistors, capacitors, inductors, diodes, etc., configured to operate according to the present disclosure.

Frequencies, voltages, and phases of the one or more AC voltage signals generated by inverter 120 may be controllable. Thus, the one or more AC voltage signals generated by inverter 120 may be controlled such that applying the AC voltages to the stator windings of motor 130 may generate a desired stator field vector. That is, the desired stator field vector may correspond to one or more desired voltages, switch timings, and/or operating positions of one or more switches of inverter 120. One or more of these desired values may be communicated to inverter 120 in the form of a voltage command. For example, inverter 120 may be configured to receive the voltage command from controller 140. In some embodiments, the voltage command may include a plurality of voltage commands. The voltage command may indicate switch timings and/or operating positions of the one or more switches of inverter 120 such that the one or more AC voltage signals generated by inverter 120 may be applied to the stator windings of motor 130 to generate a desired stator field vector. In one embodiment, the voltage command may include one or more gate commands indicative of the switch timings and/or operating positions of the one or more switches of inverter 120. In another embodiment, the voltage command may include one or more signals indicative of the desired voltages, and inverter 120 may determine the switch timings and/or operating positions of the one or more switches of inverter 120 based on the voltage command.

Motor 130 may be electrically connected to inverter 120. Motor 130 may be operable to receive one or more AC voltage signals from inverter 120 and use them to produce a torque. In some embodiments, motor 130 may include a three-phase synchronous motor configured to receive three-phase AC power from inverter 120. In other embodiments, motor 130 may include any type of synchronous AC motor known in the art, such as, for example, a single-phase synchronous AC motor or a two-phase synchronous AC motor. Solely for purpose of illustration, the following discussion treats motor 130 as a three-phase synchronous AC motor. However, it is contemplated that the present disclosure is not limited to a three-phase synchronous motor.

Motor 130 may generally include a stator and a rotor. The stator is a stationary member and may have three pairs of armature windings. The one or more of AC voltage signals may be delivered to the stator windings and generate a rotating stator magnetic field. The rotor may be positioned on a shaft within the stator. The rotor may have a permanent magnet or field windings to produce a rotating rotor magnetic field while the rotor is rotating. During operation, the rotor and thereby the rotor magnetic field will rotate synchronously with the rotating stator magnetic field. The interaction of the stator magnetic field and the rotor magnetic field can produce a torque on the rotor and, therefore, on the shaft. By manipulating the frequencies, voltages, and phases of the AC voltage signals applied to the stator windings, the torque of motor 130 may be controlled.

Controller 140 may take many forms, including, for example, a computer based system, a microprocessor based system, a microcontroller, or any other suitable control type circuit or system. Controller 140 may include various components for running software applications designed to control the torque output by motor 130. For example, controller 140 may include a processor, a memory, a storage device, an input/output (I/O) device. The processor may include one or more commercially available microprocessors, microcontrollers, digital signal processors (DSPs), and other similar devices that may be configured to perform the functions of the processor. The memory may include one or more devices configured to store information used by the processor to perform certain functions related to the disclosed embodiments. For example, the memory may store one or more motor control programs loaded from the storage device or elsewhere that, when executed, enable controller 140 to determine the DC bus voltage, calculate a plurality of basic voltage vectors based on the DC bus voltage, and generate and send a voltage command to inverter 120. The storage device may include a volatile or non-volatile, magnetic, semiconductor, tape, optical, removable, nonremovable, or other type of storage device or computer-readable medium. Controller 140 may also include one or more of an application-specific integrated circuit (ASIC), a field-programmable gate array (FPGA), a computer system, and a logic circuit, configured to allow controller 140 to function in accordance with the disclosed embodiments. Thus, the memory of controller 140 may include, for example, the flash memory of an ASIC, flip-flops in an FPGA, the random access memory of a computer system, a memory circuit contained in a logic circuit, etc. Further, controller 140 may alternatively or additionally be communicatively coupled with an external computer system. It should also be appreciated that controller 140 could readily be embodied in a general work machine control system capable of controlling numerous work machine functions.

Referring to FIG. 1, controller 140 may include an operation status detector 142, a basic voltage vector calculator 144, and a voltage command generator 146. Although these components included in controller 140 are shown as separate components, they may be implemented in any combination of hardware and/or software. For example, in one embodiment, these components may be implemented in the form of software stored in the memory and/or storage device that, when executed by the processor, enable controller 140 to perform functions related to the disclosed embodiments.

Operation status detector 142 may be configured to determine a plurality of motor operation status parameters indicative an operation status of motor 120. These motor operation status parameters may include a motor torque, a motor speed, a motor temperature, a rotor position, a magnetic field vector, and a DC bus voltage level. For example, operation status detector 142 may receive a motor torque via a communication line from a torque sensor disposed on a shaft connected to the rotor. Operation status detector 142 may receive a rotor position via a communication line from a position sensor mounted near the rotor. Based on the rotor position, operation status detector 142 may further determine the rotor field vector. Operation status detector 142 may also receive a DC bus voltage level via a communication line from a voltage sensor connected to DC bus 110.

Figure 2:
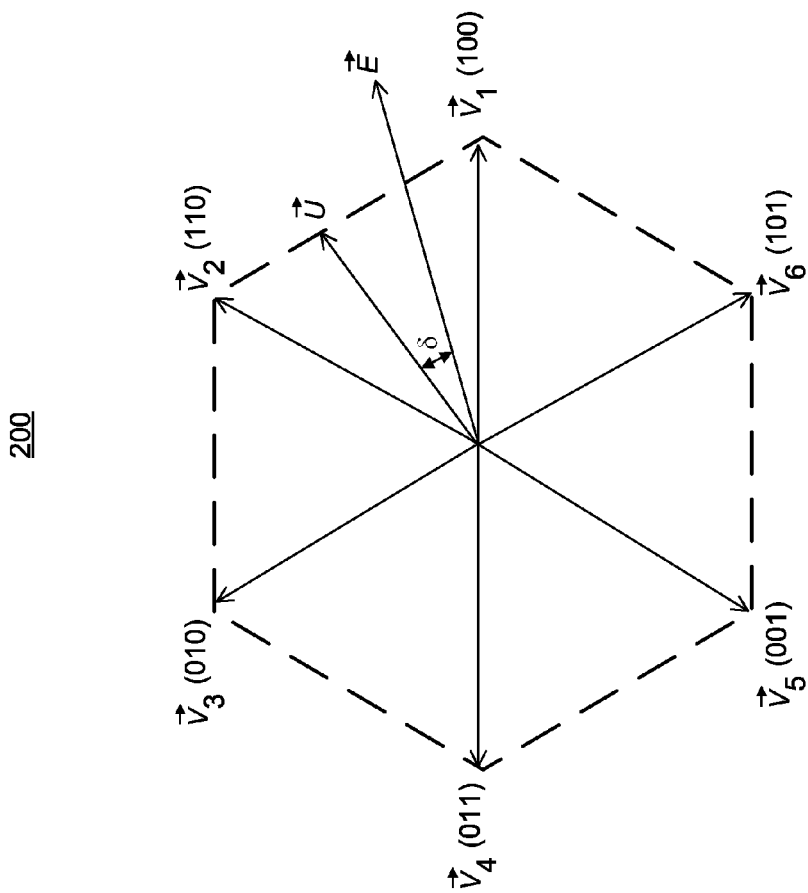
FIG. 2 is a space vector diagram utilized by the system illustrated in FIG. 1, according to an exemplary embodiment.

Basic voltage vector generator 144 may be configured to calculate a plurality of basic voltage vectors. FIG. 2 illustrates a space vector diagram 200 used by system 100 for controlling motor torque output. Referring to FIG. 2, for a three-phase synchronous motor 130, there are six basic voltage vectors. The six basic voltage vectors are defined as:

$$\vec{V}_1(100) = V_d e^{j0}$$

$$\vec{V}_2(110) = V_d e^{j\pi/3}$$

$$\vec{V}_3(010) = V_d e^{j2\pi/3}$$

$$\vec{V}_4(011) = V_d e^{j\pi}$$

$$\vec{V}_5(001) = V_d e^{j4\pi/3}$$

$$\vec{V}_6(101) = V_d e^{j5\pi/3} \quad \text{Eq. 1}$$

where $V_d$ is the DC bus voltage. Based on Eq. 1, the magnitude of each basic voltage vector is the same and is proportional to the DC bus voltage. One of skill in the art appreciates that each basic voltage vector corresponds to a basic phase of the AC voltage signals applied on the stator windings of motor 130. That is, each basic voltage vector corresponds to a switch timing and/or operating position of the one or more switches in inverter 120 and thereby the energizing pattern of the three pairs of stator windings in motor 130. Any stator field vector can be generated from the six basic voltage vectors following the rule of vector operations. The tips of the six basic voltage vectors may form the vertices of a hexagon. The six basic voltage vectors equally divide the hexagon into six sectors. A stator field vector falling within a sector can be generated by the two adjacent basic voltage vectors forming the sector according to the rule of vector operations. A stator field vector generated from one or more of the six basic voltage vectors cannot extend beyond the boundary of the hexagon. Thus, the magnitude of the generated vector is limited by the magnitude of the basic voltage vectors.

Voltage command generator 146 may be configured to generate a voltage command. The voltage command may be sent to invertor 120 to generate one or more AC voltage signals. The AC voltage signals may be applied to the stator windings of motor 130 to produce a desired stator field vector.

Referring to FIG. 2, because a torque generated by motor 130 is a cross product of a stator field vector and a rotor field vector, the magnitude of the torque depends on both the magnitude of the stator field vector $\vec{U}$ and a torque angle δ. The torque angle δ is the angle formed between the stator field vector $\vec{U}$ and the rotor field vector $\vec{E}$. To control the magnitude of the torque generated by the motor 130 at a specific DC bus voltage, controller 140 may control the magnitude of the stator field vector $\vec{U}$ and/or the torque angle δ.

Figure 3A:
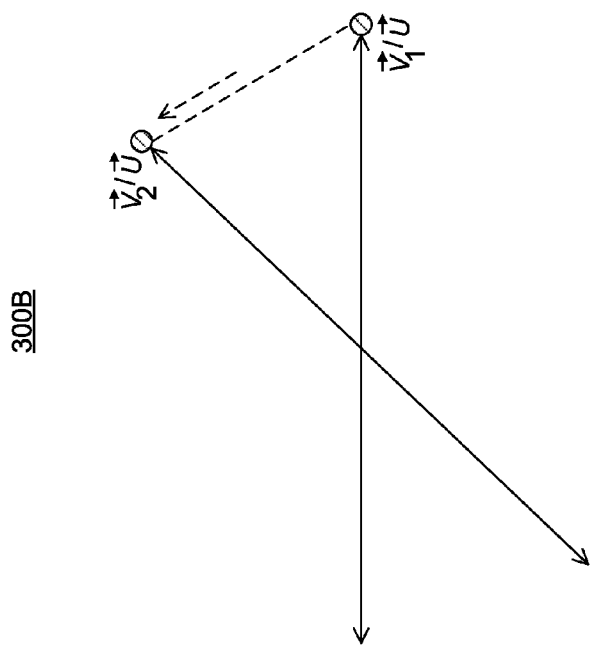
FIG. 3A is a schematic diagram illustrating a method for producing a stator field vector, according to an exemplary embodiment.

Voltage command generator 146 may cause the stator field vector to be produced in at least one of two methods described below in reference to FIGS. 3A and 3B. FIG. 3A illustrates a method 300A for producing a stator field vector, consistent with an exemplary embodiment. According to method 300A, controller 140 may determine which sector of the hexagon the stator field vector $\vec{U}$ should fall in based on the rotor field vector and a predetermined torque angle. The rotor field vector may be determined by operation status detector 142. The predetermined torque angle may be 90 degrees. Alternatively, the predetermined angle may be a function of motor operation status parameters, such as motor temperature and motor speed. In the example illustrated in FIG. 3A, the stator field vector $\vec{U}$ is determined to be in the sector formed by the two adjacent basic voltage vectors $\vec{V}_1$ and $\vec{V}_2$. The stator field vector $\vec{U}$ may be synthesized from $\vec{V}_1$ and $\vec{V}_2$ through space vector pulse-width modulation (SVPWM):

$$\vec{U} = (t_1 \vec{V}_1 + t_2 \vec{V}_2) \quad \text{Eq. 2}$$

$$\text{where } t_1 + t_2 = T \quad \text{Eq. 3}$$

T is a time period chosen by a user or selected by controller 140 to produce the stator field vector $\vec{U}$. T may be a function of motor operation status parameters such as motor speed. The two adjacent basic voltage vectors $\vec{V}_1$ and $\vec{V}_2$ may be applied for time intervals $t_1$ and $t_2$ respectively. Controller 140 may solve $t_1$ and $t_2$ based on Eqs. 2 and 3. Voltage command generator 146 may generate a voltage command based on $\vec{V}_1$, $\vec{V}_2$, $t_1$, and $t_2$. The voltage command may then be sent to inverter 120 to generate one or more AC voltage signals. The one or more AC voltage signal may further be applied to the stator windings of motor 130 to produce the stator field vector $\vec{U}$.

Referring to FIG. 3A, the locus of the synthesized stator field vector $\vec{U}$ is continuously moving along the straight lines forming the hexagon. That is, the magnitude of the stator field vector $\vec{U}$ is always reaching the limits set by the hexagon. When the stator field vector $\vec{U}$ lies along a basic voltage vector, the magnitude of the stator field vector $\vec{U}$ is equal to the magnitude of the basic voltage vector, i.e., the DC bus voltage $V_d$. When the stator field $\vec{U}$ is in between two adjacent basic voltage vectors, the magnitude of the stator field vector $\vec{U}$ is smaller than the DC bus voltage. Therefore, with the continuously-moving locus, while the stator field vector $\vec{U}$ utilizes the full DC bus voltage only when the stator field vector $\vec{U}$ lies along a basic voltage vector, the predetermined torque angle may be always maintained.

Figure 3B:
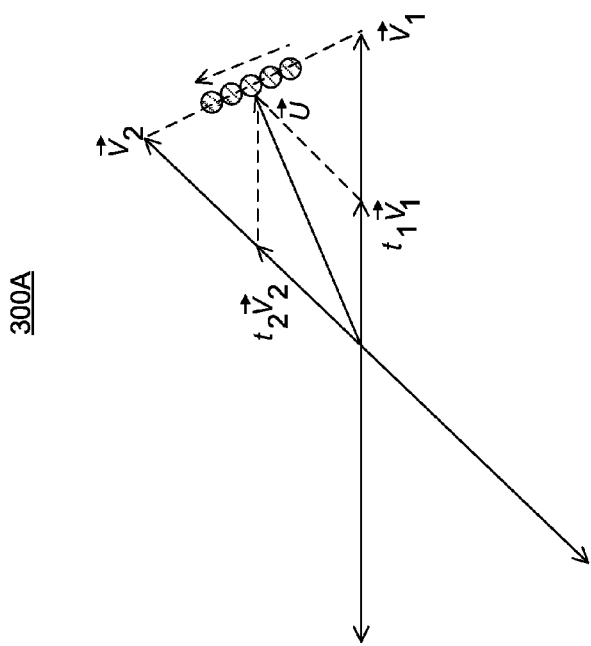
FIG. 3B is a schematic diagram illustrating another method for producing a stator field vector, according to an exemplary embodiment.

FIG. 3B illustrates a method 300B for producing stator field vector, consistent with an exemplary embodiment. According to method 300B, the stator field vector $\vec{U}$ is not synthesized from two adjacent basic voltage vectors. Rather, the stator field vector $\vec{U}$ is aligned along a selected basic voltage vector that makes the largest cross product with the rotor field vector. As the rotor field vector $\vec{E}$ is rotating, different basic voltage vectors may be constantly selected. Similar to method 300A, voltage command generator 146 may generate a voltage command to cause the stator field to be aligned with the selected basic voltage vector.

Referring to FIG. 3B, the locus of the stator field vector $\vec{U}$ is discontinuously moving among the tips of the six basic voltage vectors. The magnitude of the stator field vector $\vec{U}$ is equal to the magnitude of the basic voltage vectors, i.e., the DC bus voltage $V_d$. Therefore, with the discontinuously-moving locus, while the predetermined torque angle may not be maintained all of the time, the magnitude of the stator field vector $\vec{U}$ always utilizes the full DC bus voltage.

In exemplary embodiments, at a specific DC bus voltage, voltage command generator 146 may selectively apply method 300A or 300B based on a user input or as a function of motor operation status parameters. For example, the user may manually select a method for voltage command generator 146 to apply. For another example, voltage command generator 146 may run a weighting algorithm to weight each method's efficiency of utilizing the DC bus voltage and select the more efficient one.

INDUSTRIAL APPLICABILITY

Figure 4:
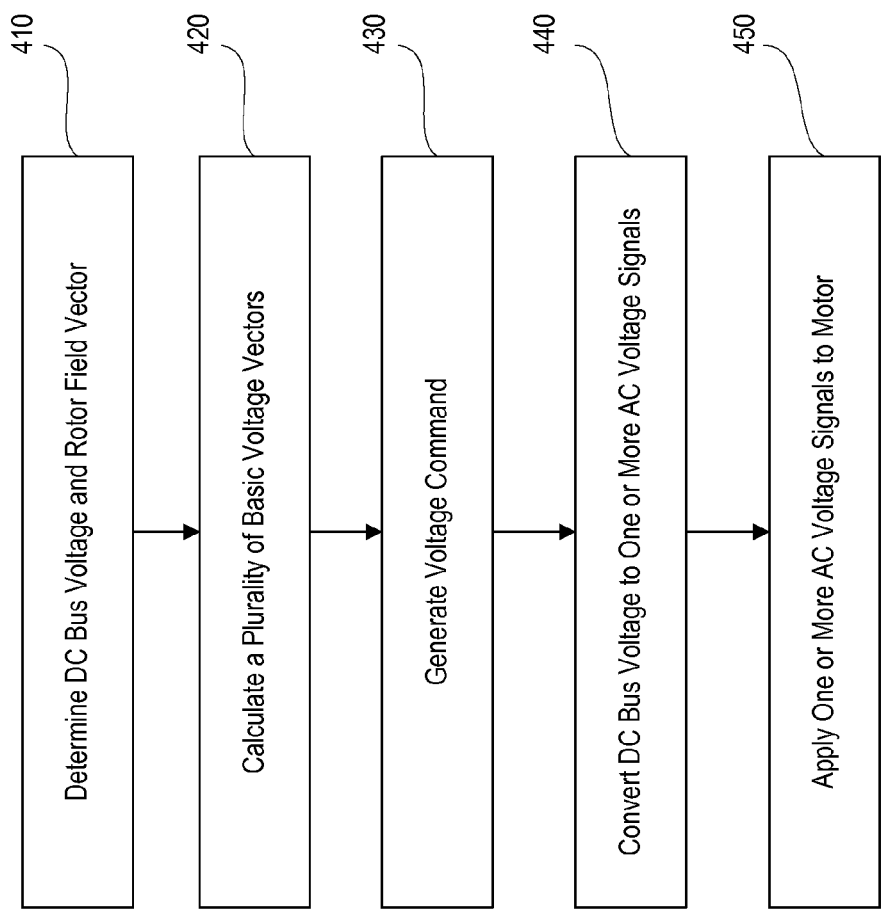
FIG. 4 is a flow chart illustrating a method of controlling motor torque output, according to an exemplary embodiment.

The disclosed motor control system 100 provides a flexible solution to control motor torque at a specific DC bus voltage. System 100 may use the DC bus voltage efficiently to produce a motor torque and thus to improve the fuel efficiency. In particular, system 100 is applicable in situations where the DC bus voltage varies frequently, such as during regenerative braking. System 100 may be integrated into various electrical drive systems. Accordingly, a method of controlling motor torque output consistent with the implementation of system 100 will now be explained with reference to FIG. 4.

In step 410, operation status detector 142 determines the DC bus voltage and rotor field vector. Operation status detector 142 may receive the DC bus voltage from a voltage sensor connected to DC bus 110. Operations status detector 142 may receive the rotor position from a position sensor mounted near the rotor and determine the rotor field vector based on the rotor position.

In step 420, basic voltage vector calculator 144 calculates a plurality of basic voltage vectors. The plurality of basic voltage vectors have the same magnitude. The magnitude is proportional to the DC bus voltage. The plurality of basic voltage vectors define a vector space where a stator field vector may be generated.

In step 430, voltage command generator 146 generates a voltage command. Voltage command generator 146 also sends the voltage command to inverter 120. The voltage command may indicate switch timings and/or operating positions of the one or more switches of inverter 120. The voltage command may be configured to selectively apply method 300A or 300B for producing a stator field vector. Method 300A includes synthesizing the stator field vector through SVPWM such that a predetermined torque angle is maintained. Method 300B includes aligning the stator field vector along a selected basic voltage vector.

In step 440, inverter 140 converts the DC bus voltage to one or more AC voltage signals according to the voltage command.

In step 450, inverter 140 applies the one or more AC voltage signals to motor 130 to produce a stator field vector. The stator field vector interacts with the rotor field vector to generate a torque.

The disclosed system 100 may help improve the efficiency of using a specific DC bus voltage to generate a torque. First, system 100 calculates a plurality of basic voltage vectors having a magnitude proportional to the DC bus voltage. By producing the stator field vector using one or more basic voltage vectors, system 100 also makes the magnitude of the stator field vector and thereby the torque output proportional to the DC bus voltage. Second, system 100 is capable of maintaining a predetermined torque angle, so as to further keep the torque output proportional to the DC bus voltage. Third, system 100 is capable of flexibly applying one of two disclosed methods for producing the stator field vector. The method leading to the larger torque at a specific DC bus voltage can be selected.

It will be apparent to those skilled in the art that various modifications and variations can be made to the disclosed system 100 for controlling motor torque output. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A system for controlling a torque output by an AC motor drawing power from a DC bus, the system comprising:
    a controller including:
        an operation status detector configured to determine a DC bus voltage and a rotor field vector;
        a basic voltage vector calculator configured to calculate a plurality of basic voltage vectors having a magnitude proportional to the DC bus voltage; and
        a voltage command generator configured to generate a voltage command for producing a stator field vector, wherein producing the stator field vector includes at least one of
            maintaining a constant angle between the stator field vector and the rotor field vector, and
            setting a magnitude of the stator field vector equal to the magnitude of the plurality of basic voltage vectors; and
    an inverter electrically connected to the controller and configured to:
        receive the voltage command,
        convert the DC bus voltage to one or more AC voltage signals according to the voltage command, and
        apply the one or more AC voltage signals to the AC motor to produce the stator field vector;
    wherein setting the magnitude of the stator field vector equal to the magnitude of the plurality of basic voltage vectors further comprises:
        aligning the stator field vector in a same direction as one of the plurality of basic voltage vectors.

2. The system of claim 1, wherein maintaining the constant angle between the stator field vector and the rotor field vector further comprises:
    synthesizing the stator field vector from one or more of the plurality of basic voltage vectors through space vector pulse-width modulation.

3. The system of claim 2, wherein the stator field vector has a continuously-moving locus.

4. The system of claim 3, wherein the locus moves on a plurality of straight lines connecting tips of the plurality of basic voltage vectors.

5. The system of claim 4, wherein the magnitude of the stator field vector is equal to or smaller than the magnitude of the plurality of basic voltage vectors.

6. The system of claim 1, wherein the stator field vector has a discontinuously-moving locus and the locus is a tip of one of the plurality of basic voltage vectors.

7. The system of claim 1, wherein the AC motor is a three-phase synchronous motor.

8. A method for controlling a torque output by an AC motor drawing power from a DC bus, the method comprising:
   determining a DC bus voltage and a rotor field vector;
   calculating a plurality of basic voltage vectors having a magnitude proportional to the DC bus voltage; and
   generating a voltage command for producing a stator field vector, wherein producing the stator field vector includes at least one of
      maintaining a constant angle between the stator field vector and the rotor field vector, and
      setting a magnitude of the stator field vector equal to the magnitude of the plurality of basic voltage vectors;
      wherein setting the magnitude of the stator field vector equal to the magnitude of the plurality of basic voltage vectors further comprises:
      aligning the stator field vector in a same direction as one of the plurality of basic voltage vectors.

9. The method of claim 8, wherein maintaining the constant angle between the stator field vector and the rotor field vector further comprises:
   synthesizing the stator field vector from one or more of the plurality of basic voltage vectors through space vector pulse-width modulation.

10. The method of claim 9, wherein the stator field vector has a continuously-moving locus.

11. The method of claim 10, wherein the magnitude of the stator field vector is equal to or smaller than the magnitude of the plurality of basic voltage vectors.

12. The method of claim 8, wherein the stator field vector has a discontinuously-moving locus and the locus is a tip of one of the plurality of basic voltage vectors.

13. A non-transitory computer-readable storage medium storing instructions for controlling a torque output by an AC motor drawing power from a DC bus, the instructions causing at least one processor to perform operations comprising:
   determining a DC bus voltage and a rotor field vector;
   calculating a plurality of basic voltage vectors having a magnitude proportional to the DC bus voltage; and
   generating a voltage command for producing a stator field vector, wherein producing the stator field vector includes at least one of:
      maintaining a constant angle between the stator field vector and the rotor field vector, and
      setting a magnitude of the stator field vector equal to the magnitude of the plurality of basic voltage vectors;
      wherein setting the magnitude of the stator field vector equal to the magnitude of the plurality of basic voltage vectors further comprises:
      aligning the stator vector in a same direction as one of the plurality of basic voltage vectors.

14. A non-transitory computer-readable storage medium of claim 13, wherein maintaining the constant angle between the stator field vector and the rotor field vector further comprises:
   synthesizing the stator vector from one or more of the plurality of basic voltage vectors through space vector pulse-width modulation.

15. The non-transitory computer-readable storage medium of claim 14, wherein the stator field vector has a continuously-moving locus.

16. The non-transitory computer-readable storage medium of claim 15, wherein the magnitude of the stator field vector is equal to or smaller than the magnitude of the plurality of basic voltage vectors.

17. A non-transitory computer-readable storage medium of claim 13, wherein the stator field vector has a discontinuously-moving locus and the locus is a tip of one of the plurality of basic voltage vectors.

* * * * *

UNITED STATES PATENT AND TRADEMARK OFFICE
CERTIFICATE OF CORRECTION

| | | |
|---|---|---|
| PATENT NO. | : 9,502,998 B1 | Page 1 of 1 |
| APPLICATION NO. | : 14/714507 | |
| DATED | : November 22, 2016 | |
| INVENTOR(S) | : Baojun Si | |

It is certified that error appears in the above-identified patent and that said Letters Patent is hereby corrected as shown below:

In the Claims

Column 10, Lines 21-22, In Claim 14, delete "A non-transitory computer-readable storage medium of claim 13," and insert -- The non-transitory computer-readable storage medium of claim 13, --.

Column 10, Lines 35-36, In Claim 17, delete "A non-transitory computer-readable storage medium of claim 13," and insert -- The non-transitory computer-readable storage medium of claim 13, --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*